UNITED STATES PATENT OFFICE.

GEORGE A. L. CLIFT, OF WEST BROMWICH, ENGLAND, ASSIGNOR TO ROBINSON BROTHERS, LIMITED, AN ENGLISH TRADING COMPANY, OF WEST BROMWICH, ENGLAND.

METHOD OF DISSOLVING AND RECOVERING RUBBER.

No. 805,903. Specification of Letters Patent. Patented Nov. 28, 1905.

Application filed March 3, 1905. Serial No. 248,324.

*To all whom it may concern:*

Be it known that I, GEORGE ALBERT LLEWELYN CLIFT, chemist, a subject of the King of Great Britain, residing at 42 Edward street, West Bromwich, in the county of Stafford, England, have invented certain new and useful Improvements in Methods of Dissolving and Recovering Rubber, of which the following is a specification.

This invention has for its object the application of a discovery I have made that pyridin and kindred bases or that mixture of pyridin and kindred bases commercially known as "heavy bases," extracted from coal-tar and other sources, such as bone-oil, are solvents for rubber, to the purpose of recovering serviceable rubber from waste rubber scraps and refuse containing rubber, such as are produced in large quantities in many trades, and to the purpose of producing rubber solutions for use as such.

In carrying out this invention for the recovery of serviceable rubber from waste scraps or refuse containing rubber the rubber material is mixed with the pyridin or a base of the pyridin group in a vessel and the rubber thus dissolved, leaving the impurities undissolved. This part of the process is conveniently carried out by the use of a number of tanks containing the solvent, into which the material to be dissolved is lowered within a cage or basket, first into one tank and then into the next throughout the whole series until the whole of the rubber has been dissolved, or by the use of a number of tanks into each of which material to be dissolved is lowered within a cage or basket, and into the whole series of which the solvent is pumped successively from tank to tank, fresh solvent being pumped into the tank of the series which at the time contains the nearly-dissolved material and the nearly-spent solvent into the tank which at the time contains the fresh material, the solvent passing from the first-mentioned to the other tank through the intermediate tanks in what is the succession of tanks at the time, these methods of working dissolving-tanks in series being well understood. When the solvent within any tank has taken up as much of the rubber as is conveniently practicable, the solution is separated from any impurities and neutralized with an acid, such as sulfuric, when the rubber separates out. The process of dissolving the rubber is quickened by heating the solvent and maintaining it at as high a temperature, such as about 100° centigrade, as will not decompose the rubber, and the heating is conveniently effected by the aid of steam-coils within the tanks, and the process is further facilitated by agitation, such as by revolving the baskets within the tanks, and it is of course advisable to use the material to be dissolved in the form of small pieces. The tanks are preferably closed when at work and are provided with reflex condensers.

The solvent may be recovered after having been neutralized by an acid by any of the well-known methods.

Preferably before, but it might be simultaneously with, the neutralizing of the solution with an acid, as above described, coal-tar benzol or other naphtha or any of the usual solvents of rubber which are admissible to be used with bases of the pyridin group which are insoluble in dilute acids and are capable of being evaporated at temperatures which will not injure the rubber may be added to the liquid in the proportion of about five gallons of commercial benzol or the other naphtha or solvent to one gallon of the liquid to take up the rubber thrown out by the acid and give a solution of rubber in the benzol or other naphtha or solvent, which solution separates out in a distinct layer from the pyridin or bases of the pyridin group when these have been neutralized with acid and may be decanted off therefrom. The addition of the lighter solvent facilitates the separation of the rubber from the pyridin or other base of that group, and the benzol or lighter solvent may be recovered from the rubber by being distilled off therefrom by means of steam or by vacuum distillation or by any other well-known means by which rubber may be separated from benzol or other naphtha or solvent, and both rubber and lighter solvent be recovered in serviceable form. The solution of rubber in the coal-tar benzol or other naphtha or solvent, however, is itself useful for many purposes, and the solution of rubber formed by treating waste or other rubber with pyridin or bases of the pyridin group may be utilized as such for many purposes, and the invention comprises the preparation of such a solution to be used as such by the treatment of serviceable rubber with pyridin or bases of the pyridin group.

On the ground both of expense and of efficiency it is preferred to use heavy bases as the solvent, according to this invention, for the rubber rather than pyridin or kindred bases alone or mixed together as they might be.

Instead of throwing out the rubber from its solution in pyridin or kindred bases or heavy bases by means of an acid, it may be thrown out by any reagent—such as wood-spirit or amyl alcohol, which when mixed with the solution of rubber in pyridin or kindred bases or heavy bases destroys the power which the solvent otherwise has of dissolving rubber and precipitates rubber therefrom. This process, however, is not applicable when the rubber is to be thrown out of the solution in the presence of the benzol or other naphtha or solvent.

Having thus described my invention, what I claim, and desire to secure by Letters Patent, is—

1. The herein-described method of recovering rubber, which consists in first dissolving out the rubber with a base of the pyridin group, and then separating the rubber from such solution with a reagent.

2. The herein-described method of recovering rubber from waste, which consists in first dissolving out the rubber with a base of the pyridin group, then precipitating the rubber from such solution with a reagent, and then recovering the base by suitable means.

3. The herein-described method of forming a solution of rubber in a volatile solvent, which consists in first dissolving waste rubber in a base of the pyridin group, then treating such solution with an acid in the presence of the volatile solvent for the separation of the rubber from the said base and its solution in the said solvent, and then separating off the said solvent, with the rubber in solution therein.

In witness whereof I have hereunto signed my name this 22d day of February, 1905, in the presence of two subscribing witnesses.

GEORGE A. L. CLIFT.

Witnesses:
ROBERT G. GROVES,
PAUL HÜFFNER.